United States Patent Office 3,046,236
Patented July 24, 1962

3,046,236
FLAME-PROOF FOAMABLE ALKENYL AROMATIC RESIN GRANULES AND METHOD OF MAKING
Alex K. Jahn, Midland, Mich., assignor to The Dow Chemical Company, Midland, Mich., a corporation of Delaware
No Drawing. Filed Feb. 17, 1960, Ser. No. 9,180
9 Claims. (Cl. 260—2.5)

This invention concerns flame-proof foamable alkenyl aromatic resin granules and a method of making the same. It relates more particularly to foamable alkenyl aromatic resin granules having a volatile organic fluid foaming agent and certain bromine-containing phosphonates as flame-proofing agents uniformly distributed throughout and pertains to a method of making the latent-foaming resin granules.

It is known to prepare non-flammable or flame-resistant alkenyl aromatic resin compositions or foams by incorporating an organic bromide with a normally solid thermoplastic alkenyl aromatic resin, e.g. polystyrene. One method of making flame-resistant foams consist in adding bromine or an organic bromine-containing compound to monomeric styrene, together with a volatile organic compound such as pentane or petroleum ether, and polymerizing the monomer while suspended in an aqueous medium under pressure until a solid polymer containing said agents uniformly distributed throughout is obtained, then cooling the materials and removing the polymer. The solid polymer containing the organic bromide and the volatile organic blowing agent expands upon heating to the softening point of the polymer or above to form a cellular product which is flame-resistant or self-extinguishing depending for the most part upon the amount of the organic bromide incorporated therewith.

However, most organic bromides have an action of impairing to some extent one or more of the properties, such as reducing the tensile strength, impact strength or heat distortion temperature of polystyrene and other polymers when incorporated therewith. Many organic halides when incorporated with the polymer by polymerizing the monomer, e.g. styrene, in the presence of the organic bromide, have an action of decreasing the molecular weight of the polymer that is obtained or of decreasing the rate of polymerization, or of both decreasing the molecular weight of the polymer and the rate of polymerization, or have a tendency to cause agglomeration of the polymer when prepared in aqueous dispersions, which is disadvantageous. Moreover the requirements for non-flammable or flame-proof foams of synthetic organic polymers which are used in the manufacture of articles such as seat cushions, refrigerators, insulation or deep freezers and the like for use in the home and industry are such that not only is it necessary that the foam itself be self-extinguishing, i.e. the foam when ignited in an open flame and the flame removed be self-extinguishing in 20 seconds or less, but that the drippings of the molten polymer which falls away from the ignited foam, be also non-flammable or incapable of supporting a flame when ignited in an open flame and the flame removed.

Accordingly, it is a primary object of the invention to provide new alkenyl aromatic resin foams containing certain bromine-containing phosphonates as flame-proofing agents which foams are not only self-extinguishing, but which drippings from the molten or ignited foam are also non-flammable. Another object is to provide latent-foaming alkenyl aromatic resin granules containing certain bromine-containing phosphonates as flame-proofing agents and a volatile organic compound, which latent-foaming resin granules are suitable for making non-flammable cellular articles. Still another object is to provide a method of making the latent-foaming alkenyl aromatic resin granules having the bromine-containing phosphonates as flame-proofing agents and a volatile organic compound uniformly distributed throughout. A further object is to provide a method for making flame-proof self-extinguishing cellular articles from thermoplastic alkenyl aromatic resins. Other and related objects will appear from the following description of the invention.

According to the invention the foregoing and related objects are obtained by intimately incorporating with a normally solid thermoplastic alkenyl aromatic resin a small but effective amount of one or a mixture of one or more bis(bromoalkyl) bromoalkylphosphonates having the general formula:

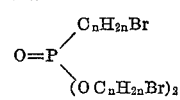

wherein $n$ is a whole number from 2 to 4, and an organic peroxide having a half life of at least 2 hours at 100° C. as synergist for the phosphonate, and a volatile fluid organic compound as blowing agent.

Surprisingly, it has been found that not only are the bis(bromoalkyl) bromoalkylphosphonates, having the aforementioned general formula, in combination with an organic peroxide, effective flame-proofing agents for the alkenyl aromatic resins and foams thereof, but that the combination renders the drippings from such ignited or molten resins or foams, flame-proof, and that said phosphonates have little, or no, action for decreasing the molecular weight of the polymer obtained or of inhibiting the rate of the polymerization when monomeric monoalkenyl aromatic compounds, e.g. styrene, vinyltoluene, dichlorostyrene and the like, are polymerized in the presence of said compounds or in admixture with said compounds, the organic peroxide and a volatile organic foaming agent such as for example, in an aqueous suspension system to obtain latent-foaming alkenyl aromatic resin granules or beads suitable for making flame-proof cellular articles.

The bis(bromoalkyl) bromoalkylphosphonates to be employed as the flame-proofing agents are readily prepared by reacting an alkylene oxide containing from 2 to 4 carbon atoms in the molecule such as ethylene oxide, 1,2-propylene oxide or 1,2-butylene oxide, with phosphorus tribromide in a solvent such as o-dichlorobenzene, toluene, xylene or the like and thereafter raising the temperature of the reaction mixture to 150° C. or higher to cause rearrangement of the phosphite to a phosphonate. The yields of the phosphonates when prepared in this manner are almost quantitative and of a purity such that after removal of the solvent, the resulting phosphonate can be employed directly for its incorporating with the organic polymer to be rendered flame-proof. The bis-(bromoalkyl) bromoalkylphosphonate can be employed in proportions corresponding to from about 0.5 to 8 percent by weight based on the weight of the polymer to be flame-proofed.

It is important that the phosphonate be employed in combination with an organic peroxygen compound, e.g. an organic peroxide, as synergist for the bromine-containing phosphonate in order to obtain the beneficial results of the invention.

Organic peroxides which can be used in the invention in combination with the phosphonate to produce a synergistic action for flame-proofing the alkenyl aromatic resin are peroxides which comprise the relatively non-volatile organic peroxy compounds boiling at 100° C. or above at 760 millimeters absolute pressure, having a half-life of at least 2 hours at 100° C. as determined in benzene and containing at least 6 carbon atoms in the molecule with at least one tertiary carbon attached to an oxygen atom of the peroxy group. The peroxy compounds to be employed have the general formula:

$$R[O—O—R']_n$$

wherein R represents a member of the group consisting of alkyl radicals containing from 2 to 9 carbon atoms, aryl and aralkyl hydrocarbon radicals of the benzene series, the acetoyl, benzoyl and the phthaloyl radical, R' represents a member of the group consisting of hydrogen, alkyl radicals containing from 2 to 9 carbon atoms, aryl and aralkyl hydrocarbon radicals of the benzene series and $n$ is an integer from 1 to 2.

Examples of suitable organic peroxygen compounds are tert.-butyl peracetate, tert.-butyl perbenzoate, di-tert.-butyl-di-perphthalate, tert.-butyl hydroperoxide, di-tert.-butyl peroxide, cumene hydroperoxide, dicumyl peroxide, cumyl ether peroxide, di-tert.-amyl peroxide, cumyl tert.-butyl peroxide, cumyl tert.-octyl peroxide, cumyl isopropyl peroxide, bis(alpha-methylbenzyl)peroxide, bis-(alpha-ethylbenzyl)peroxide, bis(alpha-propylbenzyl)peroxide, and the like.

By an "alkenyl aromatic resin" is meant a normally solid polymer of one or more polymerizable monoalkenyl aromatic compounds comprising in chemically combined form at least 70 percent by weight of at least one alkenyl aromatic compound having the general formula:

$$Ar—\overset{R}{\underset{|}{C}}=CH_2$$

wherein Ar represents an aromatic radical or a nuclear substituted aromatic halohydrocarbon radical of the benzene series and R is hydrogen or the methyl radical. Examples of such alkenyl aromatic resins are the solid homopolymers and copolymers of one or more monoalkenyl aromatic compounds such as styrene, vinyltoluene, vinylxylene, isopropylstyrene, p-tert.-butylstyrene, ar-ethylvinylbenzene, ar-chlorostyrene, ar-dichlorostyrene, ar-bromostyrene; the solid copolymers of at least 70 percent by weight of one or more of such monoalkenyl aromatic compounds with not more than 30 percent by weight of one or more other monoethylenically unsaturated copolymerizable compounds such as acrylonitrile or methyl methacrylate. Copolymers of monovinyl aromatic compounds with from 0.001 to 0.5 percent by weight of divinylbenzene, e.g. a copolymer of from 99.5 to 99.999 percent by weight of styrene and from 0.0001 to 0.05 percent of divinylbenzene, can also be used.

The volatile fluid organic compounds to be employed as foaming agents in the alkenyl aromatic resin compositions can be any volatile organic compound which dissolves appreciably in the solid polymer but in which the polymer is insoluble or only swells. Among suitable volatile organic compounds are saturated aliphatic hydrocarbons containing from 4 to 7 carbon atoms in the molecule and perchlorofluorocarbons having a molecular weight of at least 58 and a boiling point not higher than 95° C. at 760 millimeters absolute pressure. Examples of suitable volatile organic compounds are n-pentane, isopentane, neopentane, n-butane, isobutane, hexane, heptane, petroleum ether and perchlorofluorocarbons having the structure formulae:

$$CCl_3F$$
$$CCl_2F_2$$
$$CClF_3$$
$$CCl_2F—CCl_2F$$
$$CClF_2—CCl_2F$$
$$CF_3—CClF_2$$

$$\begin{array}{c} CF_2—CClF \\ |\phantom{XX}| \\ CF_2—CF_2 \end{array}$$

$$\begin{array}{c} CF_2—CClF \\ |\phantom{XX}| \\ CF_2—CClF \end{array}$$

Mixtures of any two or more of such volatile organic compounds can be used. The volatile organic compound can be employed in amounts corresponding to from about 0.05 to 0.4 gram molecular proportion of the volatile organic compound(s) per 100 grams of the monomer to be polymerized.

The latent-foaming polymer compositions can be prepared by polymerizing the monomer starting materials in admixture with the phosphonate or mixture of phosphonates and the volatile organic foaming agent in mass, i.e. in the absence or substantial absence of inert diluents or solvents for the polymer, but the polymerization is preferably and advantageously carried out while having the monomer and the added ingredients, e.g. the volatile forming agent and the phosphonate flame-proofing agent, suspended in an inert aqueous medium such as water or brine. The suspension polymerization of the monomers in admixture with the foaming agent and the flame-proofing agent permits ready control of the reaction to obtain the product in the form of discrete granules or beads of a desired size. The polymerization is advantageously carried out in the presence of a per-oxygen polymerization catalyst such as benzoyl peroxide, acetyl peroxide, di-tert.-butyl peroxide, dicumyl peroxide, tert.-butyl peroxide, di-tert.-butyl diperphthalate, tert.-butyl peracetate, tert.-butyl perbenzoate or the like or a mixture of one or more of such peroxy compounds, and in amount of from about 0.1 to 5 percent by weight, based on the weight of the monomers initially used.

It may be mentioned that the phosphonate flame-proofing agent of the invention can advantageously be employed in combination with usual organic bromides such as 1,1,2,2-tetrabromoethane, 1,2-dibromotetrachloroethane, 1,2,3,4-tetrabromobutane, monochloropentabromocyclohexane, styrene dibromide, di(bromomethyl)benzene and the like, to provide flame-proof self-extinguishing foams of alkenyl aromatic resins having improved flame-retardant properties, particularly with regard to making the drippings from such polymer foams, when ignited, flame-proof.

The phosphonate flame-proofing agents, alone, or in combination with other organic bromides, are employed together with a peroxygen compound such as dicumyl peroxide, di-tert.-butyl peroxide, tert.-butyl hydroperoxide, di-tert.-butyl diperphthalate, tert.-butyl perbenzoate, cumene hydroperoxide and the like which peroxygen compound has a half-life of at least 2 hours as determined in benzene at 100° C. and in amounts such that the foamed product contains from about 0.01 to 2, preferably from 0.1 to 0.5, percent by weight of the peroxygen compound. The specific proportions of the phosphonate and the peroxygen compound to be employed in a given instance will vary, depending in part upon the phosphonate and the peroxygen compound employed, within the ranges stated. The combination of the phosphonate and the peroxygen compound in the foam product has a synergistic action of enhancing the flame-proofing action of the phosphonate for rendering the ignited foam self-extinguishing.

The following examples illustrate ways in which the principle of the invention has been applied, but are not to be construed as limiting its scope.

EXAMPLE 1

In each of a series of experiments, a charge of 100 parts by weight of monomeric styrene, together with 0.04 part of divinylbenzene, 7.67 parts of n-pentane, 0.43 part of benzoyl peroxide as polymerization catalyst and dicumyl peroxide as peroxygen compound and bis(2-bromoethyl) 2-bromoethylphosphonate as flame-proofing agent, in amounts as stated in the following table was placed in a glass pressure resistant bottle in admixture with 125 parts by weight of water containing 0.125 part of potassium dichromate, 0.115 part of sulfonated polyvinyltoluene, ammonium salt as dispersing agent and 0.385 part of ammonium sulfate. The pH of the aqueous solution was adjusted to 6.0. The mixture was agitated and heated in the closed bottle for 11 hours at 90° C., then for 5 hours at 103° C. to polymerize the monomer. Thereafter, the mixture was cooled, the bottle opened and the polymeric product separated by filtering, washing and drying at room temperature. The product was obtained in the form of fine beads of about 1 millimeter diameter. The granular product was prefoamed by heating in steam at 100° C. for three minutes, then was placed in a closed porous mold and heated with steam to form a cellular article having the dimensions of 10 x 10 inches by ¼ inch thick. Test pieces having the dimensions of ¼ x 1 inch cross-section by 5 inches long were cut from the molded cellular article. These test pieces were used to determine the self-extinguishing characteristics for the foamed product. The procedure for determining the self-extinguishing characteristic for the foam was to hold a test piece of the foam in a horizontal position on its ¼ inch edge and move a microburner having a 1 inch flame under the free end until the foam is ignited, then remove the flame. The time in seconds for the ignited foam to be self-extinguishing was observed. In other tests, pieces of the foam were burned completely by keeping them in continuous contact with the flame and observing the burning time in seconds for which the burning polymer dripping away from the test piece continued to burn. In further tests, the accumulated drippings of the polymer were re-ignited by directing the flame upon them, then removing the flame and observing the time in seconds until the re-ignited drippings were self-extinguishing. Table I identifies the experiments and gives the proportions in parts by weight of the ingredients used in preparing the same. The table also gives the burning or self-extinguishing characteristics determined for the foamed product.

*Table I*

| Run No. | Starting Materials | | | | Foam, burning time | | |
|---|---|---|---|---|---|---|---|
| | Styrene, Parts | Divinyl-benzene, Parts | Dicumyl Peroxide, Parts | Bromo-phosphonate, Parts | Foam, Sec. | Drippings, Sec. | Re-ignited Drippings, Sec. |
| 1 | 100 | 0.04 | 0.2 | ---- | Burns | Burns | Burns |
| 2 | 100 | 0.04 | 0.2 | 2 | 12 | 3 | 15 |
| 3 | 100 | 0.04 | 0.2 | 3 | 3 | 0.5 | 8 |
| 4 | 100 | 0.04 | 0.2 | 4 | 1 | 0.5 | 3 |
| 5 | 100 | 0.04 | 0.4 | 1 | 15 | 4 | 4 |
| 6 | 100 | 0.04 | 0.4 | 2 | 5 | 5 | 15 |
| 7 | 100 | 0.04 | 0.4 | 3 | 1 | 0.5 | 3 |
| 8 | 100 | 0.04 | 0.4 | 3 | 0.25 | 0.25 | 1 |
| 9 | 100 | 0.04 | 0.4 | 4 | 0.25 | 0.25 | 1 |

EXAMPLE 2

In each of a series of experiments, foamable alkenyl aromatic resin beads were prepared employing procedure similar to that employed in Example 1, except that a mixture of bis(2-bromoethyl) 2-bromoethylphosphonate and 1,2-dibromotetrachloroethane was added to the monomers as self-extinguishing agent in amounts as stated in the following table. Table II identifies the experiments and gives the proportions of the ingredients employed in preparing the same. The table also gives the burning characteristics determined for the foamed product.

*Table II*

| Run No. | Starting Materials | | | | | Foam, Burning Time | | |
|---|---|---|---|---|---|---|---|---|
| | Styrene, Parts | Divinyl-benzene, Parts | Dicumyl Peroxide, Parts | Bromo-phosphonate, Parts | 1,2-Di-bromo-tetra-chloro-ethane, Parts | Foam, Sec. | Drippings, Sec. | Re-ignited Drippings, Sec. |
| 1 | 100 | 0.08 | 0.4 | 0.5 | 0.5 | 1 | 5 | Burns |
| 2 | 100 | 0.08 | 0.4 | 1.0 | 0.5 | 1 | 0.25 | 3 |
| 3 | 100 | 0.08 | 0.4 | 2.0 | 0.5 | 1 | 0.25 | 4 |
| 4 | 100 | 0.08 | 0.4 | 3.0 | 0.5 | 0.5 | 0.25 | 1 |
| 5 | 100 | 0.07 | 0.4 | 1.0 | 0.3 | 1.2 | 1 | 3 |
| 6 | 100 | 0.07 | 0.4 | 2.0 | 0.3 | 0.5 | 0.25 | 5 |
| 7 | 100 | 0.07 | 0.4 | 3.0 | 0.3 | 0.25 | 0.25 | 3 |
| 8 | 100 | 0.07 | 0.4 | 4.0 | 0.3 | 0.25 | 0.25 | 2 |

EXAMPLE 3

In each of two experiments, foamable alkenyl aromatic resin beads were prepared by polymerizing a mixture of 99.924 percent by weight of styrene, 0.04 percent of divinylbenzene and 0.036 percent of ethylvinylbenzene in admixture with 7.67 percent by weight of n-pentane based on the sum of the weights of the monomers, and 4 and 5 percent, respectively, of bis(X-bromobutyl) X-bromobutyl phosphonate as flame-proofing agent in an aqueous medium similar to that employed in Example 1, except that the aqueous medium contained 6 percent by weight of methyl alcohol. The product was obtained in the form of small granules or beads of substantially uniform size. Portions of the product were foamed and tested for its self-extinguishing characteristics employing procedure similar to that employed in Example 1. The foamed product was found to have the properties given in Table III.

*Table III*

| Test No. | Bromo-phospho-nate, Percent | Burning Time | | |
|---|---|---|---|---|
| | | Foam, Sec. | Drippings, Sec. | Re-ignited Drippings, Sec. |
| A | 4 | 0.25 | 0.25 | 4 |
| B | 5 | 0.25 | 0.25 | 5 |

EXAMPLE 4

In each of a series of experiments, foamable alkenyl aromatic resin beads were prepared by polymerizing a mixture of monomers consisting of 99.924 percent by weight of styrene, 0.04 percent by weight of divinylbenzene and 0.036 percent by weight of ethylvinylbenzene, in an aqueous suspension in admixture with 7.67 percent by weight of n-pentane, based on the sum of the weights of the monomers, as foaming agent, 0.43 percent of benzoyl peroxide as polymerization catalyst and bis(2-bromoethyl) 2-bromoethylphosphonate and an organic peroxygen compound in kind and amounts as stated in the following table as synergist for enhancing the flame-proofing characteristics of the phosphonate employing a procedure similar to that employed in Example 1. The divinylbenzene employed in the experiment was a distillation fraction consisting of about 60 percent by weight of a mixture of meta- and para-divinylbenzenes and about 40 percent of a mixture of meta- and para-ethylvinyl-benzenes in which fraction the proportion of meta-isomers was about 65 percent and the para-isomers were about 35 percent, respectively, little or no ortho-isomers were present in the mixture. The polymerization product was recovered as uniform small beads. Portions of the product were foamed to form a cellular body and the foamed product was tested for its self-extinguishing characteristics employing procedure similar to that employed in Example 1. Table IV identifies the experiments and names the organic peroxygen compound and the bis(2-bromoethyl) 2-bromoethylphosphonate in the foamed product and the self-extinguishing characteristics determined for the product.

*Table IV*

| Run No. | Resin, Parts | Starting Materials, Organic Peroxygen Compound | | Bromo-phospho-nate, Percent | Foam, Burning Time | | |
|---|---|---|---|---|---|---|---|
| | | Kind | Percent | | Foam, Sec. | Drippings, Sec. | Re-ignited Drippings, Sec. |
| 1 | 100 | Dicumyl Peroxide | 0.4 | 1 | 15 | 4 | 4 |
| 2 | 100 | ----do---- | 0.4 | 3 | 1 | 0.5 | 2 |
| 3 | 100 | ----do---- | 0.2 | 4 | 1 | 0.5 | 3 |
| 4 | 100 | Di-tert.-Butyl Peroxide | 0.4 | 4 | 2.5 | 0.25 | 2 |
| 5 | 100 | Di-tert.-Butyl Diperphthalate | 0.2 | 4 | 3 | 0.5 | 10 |

I claim:

1. A foamable thermoplastic polymer composition capable of being expanded to produce a self-extinguishing cellular body comprising a flammable thermoplastic polymer consisting of at least 70 percent by weight of at least one alkenyl aromatic compound having the general formula:

$$Ar-\overset{R}{\underset{|}{C}}=CH_2$$

wherein Ar represents an aromatic radical of the group consisting of hydrocarbon and nuclear halo-substituted hydrocarbon radicals of the benzene series and R is a member of the group consisting of hydrogen and the methyl radical, having uniformly dispersed throughout a volatile fluid organic compound having a molecular weight of at least 58 and a boiling point not higher than 95° C. and 760 millimeters absolute pressure, as foaming agent and in which the polymer is substantially insoluble and as flame-proofing agents, based on the weight of the polymer, from 0.5 to 8 percent of a bromine-containing phosphonate having the general formula:

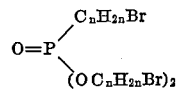

wherein $n$ is a whole number from 2 to 4, and from 0.01 to 2 percent of an organic peroxide having the general formula:

$$R[O-O-R']_n$$

wherein R represents a member of the group consisting of alkyl radicals containing from 2 to 9 carbon atoms, aryl and aralkyl hydrocarbon radicals of the benzene series, the acetoyl, the benzoyl and the phthaloyl radical, R' represents a member of the group consisting of hydrogen, alkyl radicals containing from 2 to 9 carbon atoms, and aryl and aralkyl hydrocarbon radicals of the benzene series and $n$ is an integer from 1 to 2, said organic peroxide having a boiling point of at least 100° C. at 760 millimeters absolute pressure, a half-life of at least 2 hours as determined in benzene at 100° C., containing at least 6 carbon atoms in the molecule and having at least one tertiary carbon atom attached to an oxygen atom of the peroxy group.

2. A composition as claimed in claim 1, wherein the bromine-containing phosphonate is bis(2-bromoethyl) 2-bromoethylphosphonate and the organic peroxide is dicumyl peroxide.

3. A composition as claimed in claim 1, wherein the bromine-containing phosphonate is bis(X-bromobutyl) X-bromobutylphosphonate and the organic peroxide is dicumyl peroxide.

4. A composition as claimed in claim 1, wherein the thermoplastic polymer is a copolymer of at least 99.9 percent by weight of a monovinyl aromatic hydrocarbon of the benzene series with not more than 0.1 percent by weight of divinylbenzene.

5. A foamable thermoplastic polymer composition capable of being expanded to produce a self-extinguishing cellular body comprising a flammable thermoplastic copolymer of at least 99.9 percent by weight of a monovinyl aromatic hydrocarbon of the benzene series and not more than 0.1 percent of divinylbenzene, having uniformly dispersed throughout a saturated aliphatic hydrocarbon containing from 4 to 7 carbon atoms as foaming agent and as flame-proofing agents, based on the weight of the polymer, from 0.5 to 8 percent of bis(2-bromoethyl) 2-bromoethylphosphonate and from 0.01 to 2 percent of dicumyl peroxide.

6. A self-extinguishing cellular polymer composition comprising a foamed flammable thermoplastic polymer consisting of at least 70 percent by weight of at least one alkenyl aromatic compound having the general formula:

$$Ar-\overset{R}{\underset{|}{C}}=CH_2$$

wherein Ar represents an aromatic radical of the group consisting of hydrocarbon and nuclear halo-substituted hydrocarbon radicals of the benzene series and R is a member of the group consisting of hydrogen and the methyl radical, having uniformly dispersed throughout as flame-proofing agents the combination of from 0.5 to 8 percent by weight of a bromine-containing phosphonate having the general formula:

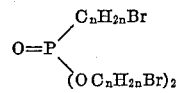

wherein $n$ is a whole number from 2 to 4, and from 0.01 to 2 percent by weight of an organic peroxide having the general formula:

$$R[O-O-R']_n$$

wherein R represents a member of the group consisting of alkyl radicals containing from 2 to 9 carbon atoms, aryl and aralkyl hydrocarbon radicals of the benzene series, the acetoyl, the benzoyl and the phthaloyl radical, R' represents a member of the group consisting of hydrogen, alkyl radicals containing from 2 to 9 carbon atoms and aryl and aralkyl hydrocarbon radicals of the benzene series and $n$ is an integer from 1 to 2, said organic peroxide having a boiling point of at least 100° C. at 760 millimeters absolute pressure, a half-life of at least 2 hours as determined in benzene at 100° C. containing at least 6 carbon atoms in the molecule and having at least one tertiary carbon atom attached to an oxygen atom of the peroxy group.

7. A self-extinguishing cellular polymer composition as claimed in claim 6, wherein the foamed polymer is a copolymer of at least 99.9 percent by weight of at least one monovinyl aromatic hydrocarbon of the benzene series and not more than 0.1 percent of divinylbenzene and the organic peroxide is dicumyl peroxide.

8. A method for making a foamable thermoplastic polymer composition cable of being expanded by heating to produce a self-extinguishing cellular body, which method comprises heating a liquid consisting essentially of at least one polymerizable monomer consisting of at least 70 percent by weight of at least one alkenyl aromatic compound having the general formula:

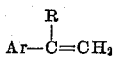

wherein R represents an aromatic radical of the group consisting of hydrocarbon and nuclear halo-substituted hydrocarbon radicals of the benzene series and R is a member of the group consisting of hydrogen and the methyl radical, a volatile fluid organic compound having a molecular weight of at least 58 and a boiling point not higher than 95° C. at 760 millimeters absolute pressure, which is soluble in the monomer and the polymer and is a non-solvent for the polymer, and based on the weight of the monomers, from 0.5 to 8 percent of a bromine-containing phosphonate having the general formula:

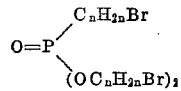

wherein $n$ is a whole number from 2 to 4, and from 0.01 to 2 percent of an organic peroxide having the general formula:

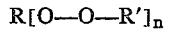

wherein R represents a member of the group consisting of alkyl radicals containing from 2 to 9 carbon atoms, aryl and aralkyl hydrocarbon radicals of the benzene series, the acetoyl, the benzoyl and the phthaloyl radical, R' represents a member of the group consisting of hydrogen and aryl and aralkyl radicals of the benzene series and $n$ is an integer from 1 to 2, at temperatures between about 40° and 120° C. under a pressure at least as great as the pressure of the mixture of the materials while having the liquid dispersed as droplets in an aqueous medium until the monomer is substantially polymerized, then cooling the reaction mixture to a temperature below 40° C.

9. A method as claimed in claim 8, wherein the monomer is a mixture of at least 99.9 percent by weight of at least one monovinyl aromatic hydrocarbon of the benzene series and not more than 0.1 percent of divinylbenzene and the organic peroxide is dicumyl peroxide.

References Cited in the file of this patent

UNITED STATES PATENTS

| | | |
|---|---|---|
| 2,676,927 | McCurdy et al. | Apr. 27, 1954 |
| 2,725,311 | Kenaga | Nov. 29, 1955 |